US007278335B2

(12) United States Patent
Zhang

(10) Patent No.: US 7,278,335 B2
(45) Date of Patent: Oct. 9, 2007

(54) ADJUSTABLE THREADED BEARING AND BEARING ASSEMBLY FOR A WINDOW OPERATOR AND FEATURE

(76) Inventor: She Shun Zhang, Rm. 501, #7, 133 Lang Zhang Hong Rd., Shanghai 200336 (CN)

( * ) Notice: Subject to any disclaimer, the term of this patent is extended or adjusted under 35 U.S.C. 154(b) by 516 days.

(21) Appl. No.: 10/616,711

(22) Filed: Jul. 10, 2003

(65) Prior Publication Data

US 2006/0144180 A1 Jul. 6, 2006

(51) Int. Cl.
*F16H 1/16* (2006.01)

(52) U.S. Cl. .......................................... 74/425; 49/342

(58) Field of Classification Search .......... 49/341–345, 49/337, 339, 350; 403/362, 151; 74/425; 384/129, 428, 276, 439, 295, 440, 416
See application file for complete search history.

(56) References Cited

U.S. PATENT DOCUMENTS 1,971,360 A * 8/1934 Watson ........................ 49/342
2,337,913 A * 12/1943 McClearen .................. 49/342
2,635,485 A * 4/1953 Gravenstine et al. ..... 74/606 R
4,253,276 A 3/1981 Peterson et al.
4,445,794 A 5/1984 Sandberg
4,505,601 A 3/1985 Sandberg et al.
4,938,086 A * 7/1990 Nolte et al. ................ 74/89.14
5,056,193 A * 10/1991 Colamussi ................... 16/262
5,280,968 A * 1/1994 Moore et al. ................. 285/94
5,374,135 A * 12/1994 Folsom et al. .............. 403/369
5,405,398 A * 4/1995 Buford et al. ........... 623/20.27
5,678,944 A * 10/1997 Slocum et al. ................ 403/13
5,765,308 A 6/1998 Anderson et al.
5,768,942 A * 6/1998 Gruber et al. ............. 74/89.14
5,802,913 A * 9/1998 Winner ...................... 74/89.18
6,634,141 B2 * 10/2003 Anderson et al. ............. 49/342
2002/0078630 A1 * 6/2002 Lee et al. ..................... 49/342

* cited by examiner

*Primary Examiner*—Richard Ridley
*Assistant Examiner*—Terence Boes
(74) *Attorney, Agent, or Firm*—Akin Gump Strauss Hauer & Feld LLP

(57) ABSTRACT

A bearing assembly for use with a window operator has a housing with an operator slot and a bore through which is threaded an adjustable bearing. The bearing contains a smooth end with two walls of differing diameter that form shoulders. The shoulders fit substantially against an inner and outer surface of the slot to rotatably position and secure an operator arm therein.

8 Claims, 4 Drawing Sheets

21 2 21a 7 20 2 21b 1 3a 9 4 3 8 3c 3b

ADJUSTABLE THREADED BEARING AND BEARING ASSEMBLY FOR A WINDOW OPERATOR AND FEATURE

FIELD OF THE INVENTION

This invention relates to a window operator and, in particular, to a new adjustable threaded bearing and bearing assembly used in a window operator.

BACKGROUND OF THE INVENTION

Devices for operating casement-type windows are known in the art. Generally window operators provide a connection between the window frame and the window sash which causes the window to open and close by moving the window sash linearly away from or towards the window frame, respectively. The position of the window sash is also secured by the operator so the window can be maintained in an open, partially open or closed position. Stability and torque performance of a particular operator affect the user's control of the window sash and thus the difficulty or ease with which a window can be adjusted.

In some devices, the window operator comprises an assembly which is mounted on the sill of the window frame. The assembly contains an operating arm that connects to the window sash, using connecting links, for example, and a manual crank for cooperating with the operator to adjust the window. A gear section on one end of the operating arm pivotally mounts within the assembly casing by a straight shock, also referred to as a pivot pin or rivet. The gear section engages a worm gear portion of a window crank for moving the operating arm. The other end of the arm moveably attaches to a connecting link connected to the window sash. Manual operation of the crank moves the window.

Some common window operators are inconsistent in their movement. Many factors influence the inconsistency. One factor includes the cooperation between the operator arm and the worm gear. Another includes the tolerances of the metal sheet and powder coating thicknesses typically used in the assembly design. Such products can have connecting arms that suffer from vertical movement after the operators are assembled. This prevents smooth, consistent movement of the arm. Another factor results from excess space inside the slot which holds the operator arm within the housing. A gap often forms between the top of the operator arm and the inside top of the slot. Again this can lead to vertical free play of the operator arm, and affect the arm's connectability with the worm gear of a window crank. The cooperation between the arm and worm gear may be loose also shortening the life time of the operator. In part, the present assembly addresses these drawbacks by providing an adjustable bearing that minimizes or eliminates problems associated with the tolerances or construction material and minimizes or eliminates the gap within the housing slot.

SUMMARY OF THE INVENTION

In general, the present invention provides an adjustable threaded bearing and bearing assembly for use with a window operator. The adjustable bearing comprises of an annular bearing having a threaded end and a smooth end. Smooth end has two flat walls of differing diameter that form two shoulders. The bearing fits within a bore located in the assembly housing designed so that one bearing shoulder rests against a part of the inner top surface of an operator slot horizontally disposed therein and the other rests against a part of the outer bottom surface of the slot. The bearing is tightened into place by adjusting it using an indented portion of the threaded end. In turn the partially circular head part of the operator arm is securely positioned inside of the slot while still able to round and move about the bearing. The opposite end of the operator arm connects directly or indirectly to the window sash.

A gear section on the rim of the circular head is positioned to communicate with the worm gear end of the crank. The bearing brings the arm closer to the worm gear facilitating a better connection with the worm gear. The closer connection improves the association of movement between the gear section of the operator arm and the worm gear, and improves operating stability by controlling the free play of the arm. At the opposite end of the crank, a handle is attached for operation by a user.

The base of the present assembly housing is generally flat, except for an end drop. In an example, an end of the base has a slight drop, by comparison with the rest of the base, that edges the window frame. The end drop extends over the window frame enabling the base to fix on the window frame. This eases installation and prevents air or weather elements, such as rain water, from travelling in or out from under the window. Unlike some prior art which provides a groove along an underneath section of the assembly casing for placement about the window frame, a groove is unnecessary in the present assembly because the back side of the housing is flat.

The parts of the assembly are constructed out of durable material such as metal. Preferably, the housing case is made from cast zinc, and the operator arm and threaded bearing are made from metal. No deformable materials are necessary.

Other features, aspects and advantages of the present invention will become better understood or apparent from the following detailed description, drawings and appended claims of the invention.

DESCRIPTION OF EXAMPLES OF THE INVENTION

Figure 1:
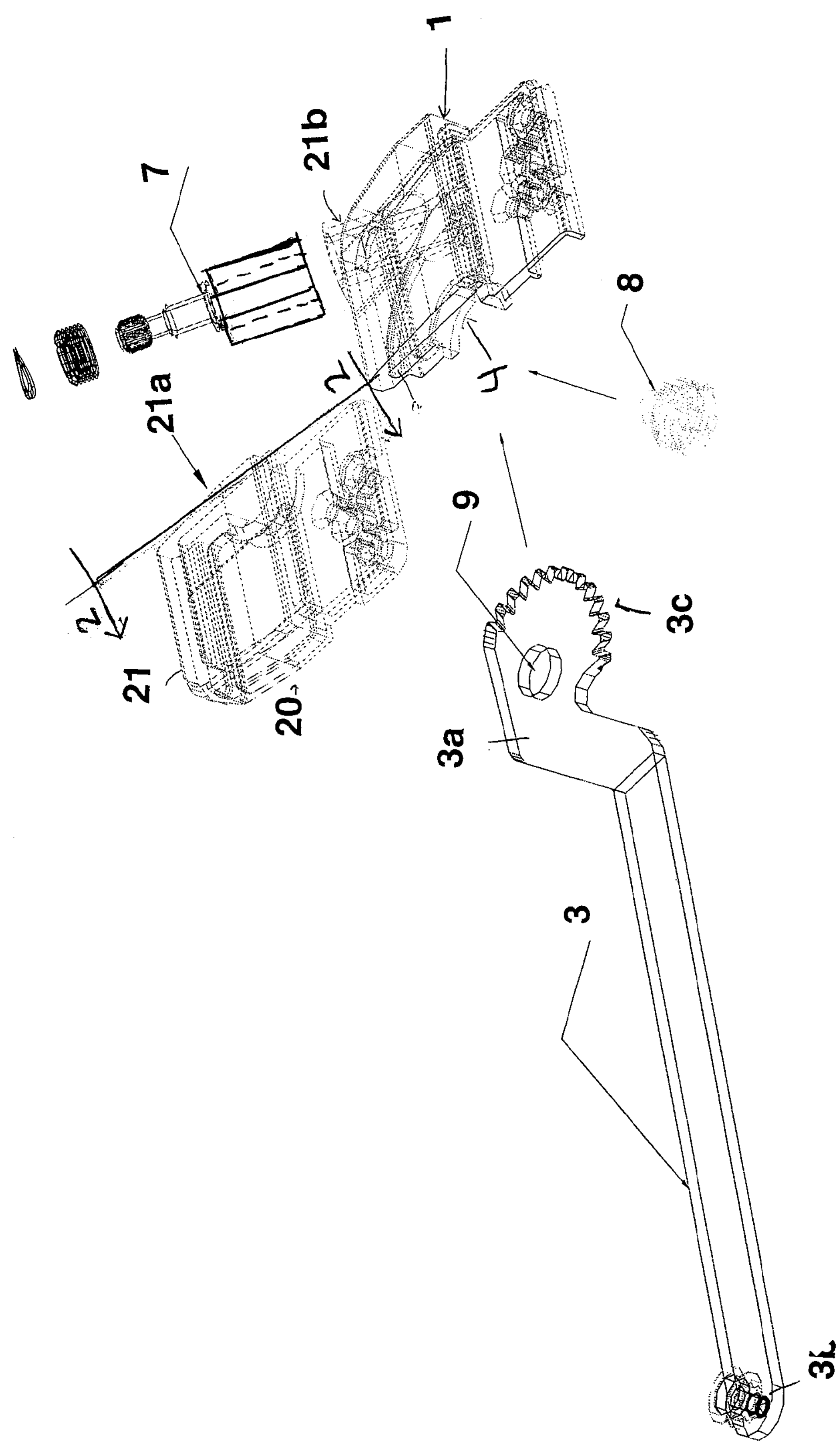
FIG. 1 is a perspective view of a window operator in an example embodying the present invention.

An example of an embodiment of the present window operator is shown generally in FIG. 1. The operator comprises a housing 1 having a base 20 for mounting the housing on a window frame using conventional means and a top part 21. Top part 21 has a partially raised section 21*a*. Disposed on raised section 21*a* is an upper tubular section 21*b* through which a worm gear 7 (schematically shown) of a window crank (not shown) extends. An internal slot section 2 generally extends a part of the length of raised section 21*a* and is designed and oriented to accommodate an operator for opening and closing a window.

Figure 2:
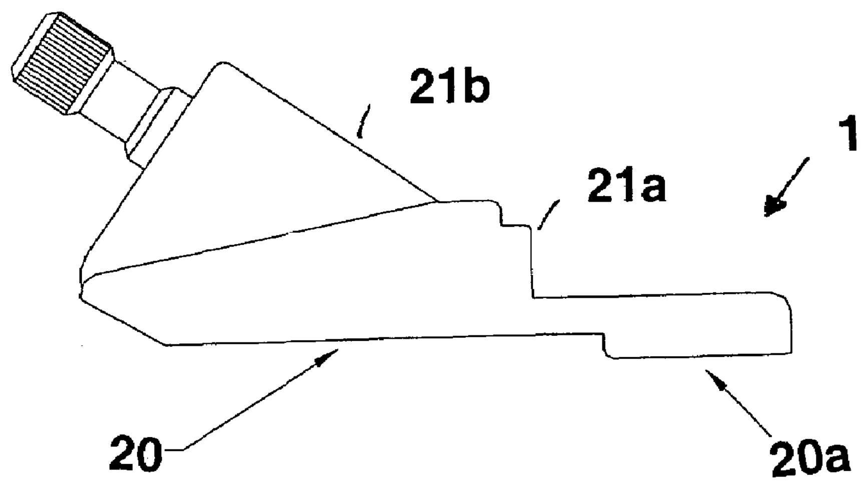
FIG. 2 shows an outline of a side view of an embodiment of the assembly of the present invention.

The base 20 of the housing 1 is generally flat, except for an end drop 20*a,* as illustrated for example in FIG. 2. In an example, base 20 has an interior support surface and a bottom exterior surface. Bottom exterior surface has a level surface with lowered portion or slight drop on one end, by comparison with the rest of the base, that edges the window frame. To mount the assembly, the end drop extends over the window frame enabling the base to fix on the window frame. Base 20 can comprise or have a cover or casing.

An operator arm 3 has a partially circular head part 3*a* which is insertable into slot section 2 and an elongated connector end 3*b* which extends outwardly from the housing. Connector end 3*b* is attachable to a window sash (not shown) directly or by use of connection links (also not shown). Generally centered in the head part 3*a* is a hole 9. Head part 3*a* also has a gear section 3*c* or other functional edging to communicate with the worm gear portion of the crank. In an example, gear section 3*c* is positioned along the rim of the circular portion of the arm head part.

Figure 3:
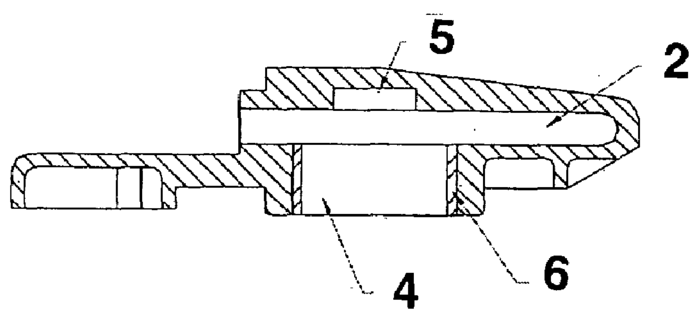
FIG. 3 is a cross sectional view, taken generally along the line 2-2 shown in FIG. 1, of an embodiment of the invention showing the operator slot and boring without the bearing and worm gear.

Operator arm 3 is inserted into slot section 2 and is generally positioned so that hole 9 is aligned or centered with an internal bore 4. Internal bore 4 generally extends from an open end of the interior support surface of base 20 (or, preferably, inside the casing) to a closed end 5 in the top part 21. Bore 4 creates a cylindrical hole in a section of top part 21 above slot section 2 terminating at closed end 5, as shown for example in FIGS. 1 and 3. Closed end 5 has a reduced diameter compared to the bore open end. The open end of internal bore 4 is lined with an internal thread 6. In an example, open end is positioned at about the middle of the length of or generally centered on the bottom of slot section 2 as shown in FIG. 3. However, location of the bore varies depending upon what is appropriate in the particular configuration of the assembly.

Figure 4:
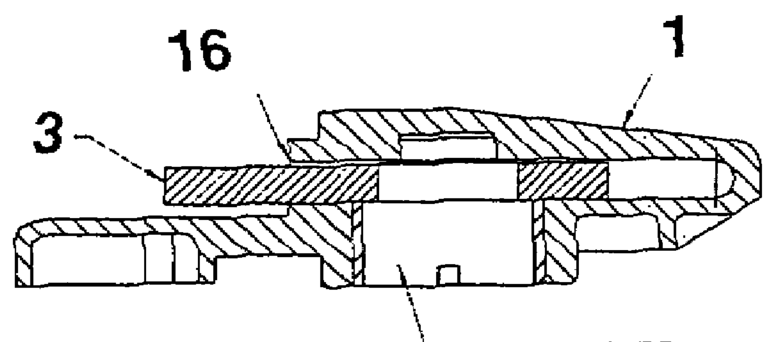
FIG. 4 is a cross sectional view, taken generally along the line 2-2 shown in FIG. 1, of an embodiment of the invention with an adjustable threaded bearing fit inside the bore.

When the operator arm 3 is inserted into slot 2 of the housing a gap 16 forms between the operator arm 3 and the upper part of the slot section 2, as shown in a cross sectional view of an embodiment of the invention in FIG. 4. This gap 16 can cause operator arm 3 to experience free vertical movement which results in its looseness. This in turn affects the precision of the operation between operator arm 3 and worm gear 7, and reduces the life span of the window operator.

To minimize or alleviate these concerns, an adjustable bearing 8 is placed into bore 4 of the housing. Adjustable bearing 8 has a generally cylindrical body with an internal end 17 and an external threaded end 13. Threaded bearing 8 is disposed through bore 4 and hole 9 to rotatably mount the operator arm 3 within housing 1. External threaded end 13 threads into internal thread 6 of the bore and inner end 17 fits inside bore 4 extending into the top part, closed end 5. In an example, hole 9 is positioned on head part 3*a* in an appropriate place to permit bearing 8 to generally align within bore 4.

In an example of the invention, inner end 17 is comprised of two essentially flat annular walls, 10*a* and 11*a*. One wall 10*a* has a more narrow diameter than the other wall 11*a* and both have a more narrow diameter than threaded end portion 13. In another example, wall 11*a* and some inner thread parts of threaded end portion 13 have generally the same diameter. Flat walls 10*a* and 11*a* form two shoulders, 10*b* and 11*b*. Threaded adjustable bearing 8 is secured in the bore by the shoulders. This works in stages at two sides (10,11) which adjust operator arm 3 vertically. The first shoulder 10*b* rests against a part of the inner surface of slot 2, or outer surface of top part 21*a*. Second shoulder 11*b* fits against a part of the outer surface of slot 2. Additional internal surfaces and corresponding bearing shoulders or walls can be incorporated within the assembly as appropriate.

Figure 5:
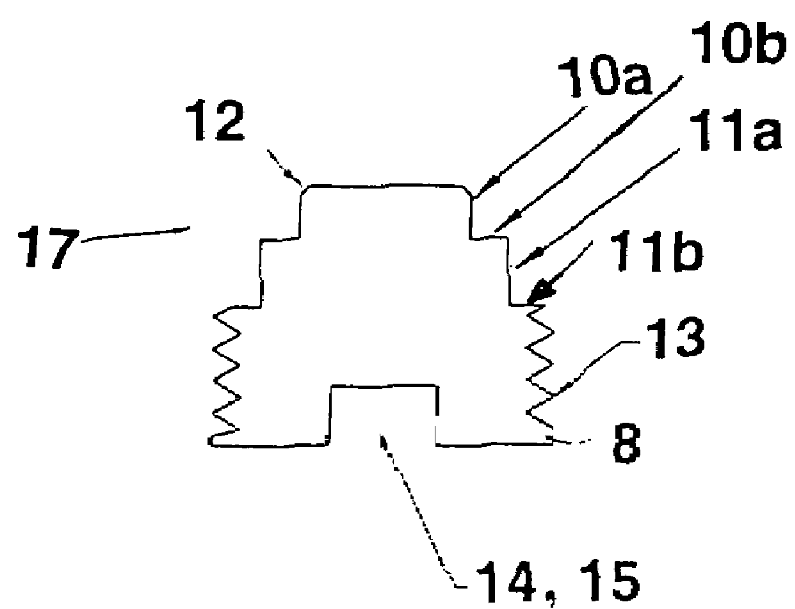
FIG. 5 is a cross sectional view, taken generally along the line 5-5 shown in FIG. 6*a*, of an embodiment of the invention with an adjustable threaded bearing fit inside the bore.

The end of inner end 17 is flat or gradually curved. In an example, a small rounded corner 12 is formed on the end of inner end 17. Rounded corner 12 enhances assembly performance and benefits production for joining the pieces together. A cross sectional view of an example of an embodiment of the adjustable threaded bearing is illustrated in FIG. 5. In another example, small rounded corner 12 is replaced by a flat edge or vertical slope part.

Figure 6:
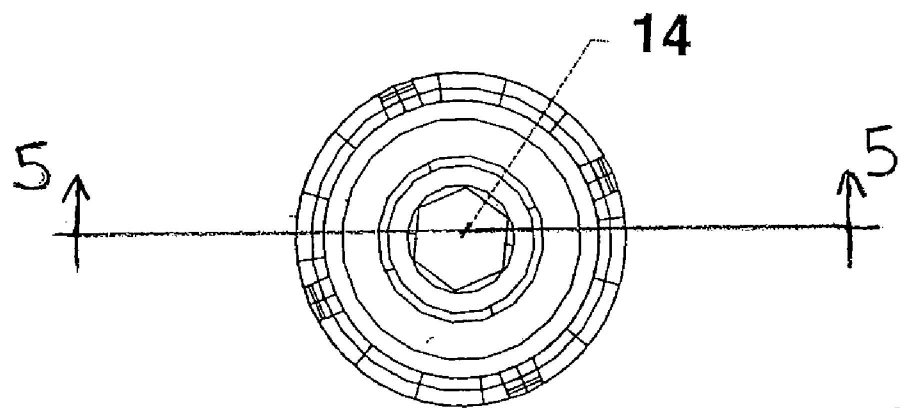
FIGS. 6*a* and 6*b* are bottom views of the adjustable threaded bearing with different adjustable holes embodying the invention.
Figure 6:
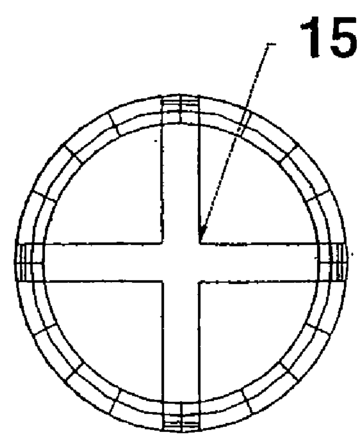

An indented interface or tool slot on the bottom or end part of threaded portion 13 provides an adjustment means for securing bearing 8 into the housing. For example, by reference to FIGS. 6*a* and 6*b,* the bottom of the threaded portion 13 contains an essentially flat surface with an indent marked with a tool interface such as a hexagon hole 14 or a cross 15 for accepting a Philips screw head. Adjustor indent is located appropriately to permit a user to thread and lock the bearing in place. Other designs or configurations may be interchanged to provide a tool interface and promote adjustment of the screw bearing. Once assembled and adjusted, bearing 8 is tightened into place. Threaded bearing 8 secures the operator arm 3 within slot section 2. Bearing 8 permits movement of the operator arm while holding it in place.

The bearing assembly is assembled by first aligning the operator arm hole 9 and housing bore 4 in slot section 2. Second, the adjustable threaded bearing 8 is inserted through the open end of bore 4, through the bore 4, through slot section 2 and arm hole 9, and extending up through and to the bore closed end 5, and thread with internal thread 6. The top of the inner end 17 of bearing 8 rests against or near to a portion of a lower wall of top part 21. Bearing 8 does not extend through the case. In an example, this portion of top part 21 is designed to accommodate the dimensions of inner end 17. For example, it comprises a cylindrical open hole in top part 21 generally centered with slot section 2. Orientation is appropriate to advantageously position the bore for communicating with the worm gear. Bore 4 is designed to accommodate contour perimeter of bearing 8.

The assembly mounts to a window frame by positioning the front end drop of the base along the frame. The assembly is secured to the frame with screws or other affixment means. The movement of operator arm is driven by the worm gear, and the worm gear is driven by the crank which is driven by the operator's hand. Operator arm 3 moves around bearing 8, and connector end, attached directly or indirectly to a window sash, functions for opening and closing windows. The smooth movement of operator arm 3 is achieved by the close association of movement between operator arm 3 and worm gear 7. This adjustment bearing 8 can be used to adjust the vertical position of operator arm 3 in slot section 2 in housing 1, reduce or eliminate any free vertical movement of arm 3, and to ensure operator arm 3 and worm gear 7 are in a pre-fixed position.

While the foregoing has been set forth in considerable detail, it is to be understood that the drawings and detailed embodiments are presented for elucidation and not limitation. Those skilled in the art will realize that changes or modifications of the invention or combinations of elements, variations, equivalents or improvements therein are still within the scope of the invention as defined in the appended claims.

What is claimed is:

1. A bearing assembly for a window operator comprising a housing having a bore with a closed inner end and an outer threaded end, a bearing having a smooth end and an opposite end threaded into said threaded end, said smooth end having first and second walls forming first and second shoulders, a diameter of said first wall being smaller than a diameter of said second wall, a slot extending part of the length of said housing, said second wall being located within said slot, and an operator arm disposed in said slot surrounding said second wall.

2. A bearing assembly for a window operator as set forth in claim 1 wherein said first shoulder rests against a first wall of said slot.

3. A bearing assembly for a window operator as set forth in claim 1 wherein said second shoulder rests against a second wall of said slot.

4. A bearing assembly for a window operator as set forth in claim 1 wherein said first wall has a rounded corner.

5. A bearing assembly for a window operator as set forth in claim 1 wherein said operator arm has a head part with a hole positioned to accept said bearing in a rotative position in said bore.

6. A bearing assembly for a window operator as set forth in claim 1 wherein said operator arm has a head part containing a gear section, said gear section being communicable with a crank operator.

7. A bearing assembly for a window operator as set forth in claim 1 further consisting of a crank operator having worm gear positioned to communicate with said pg,9 operator arm gear section.

8. A bearing assembly for a window operator as set forth in claim 1 wherein said housing further includes a base, said base is substantially flat with a lower portion on one end.

* * * * *